Nov. 13, 1934. J. P. HANSON 1,980,269
SIGNAL SWITCH FOR AUTOMOBILES
Filed Jan. 7, 1931 2 Sheets-Sheet 1
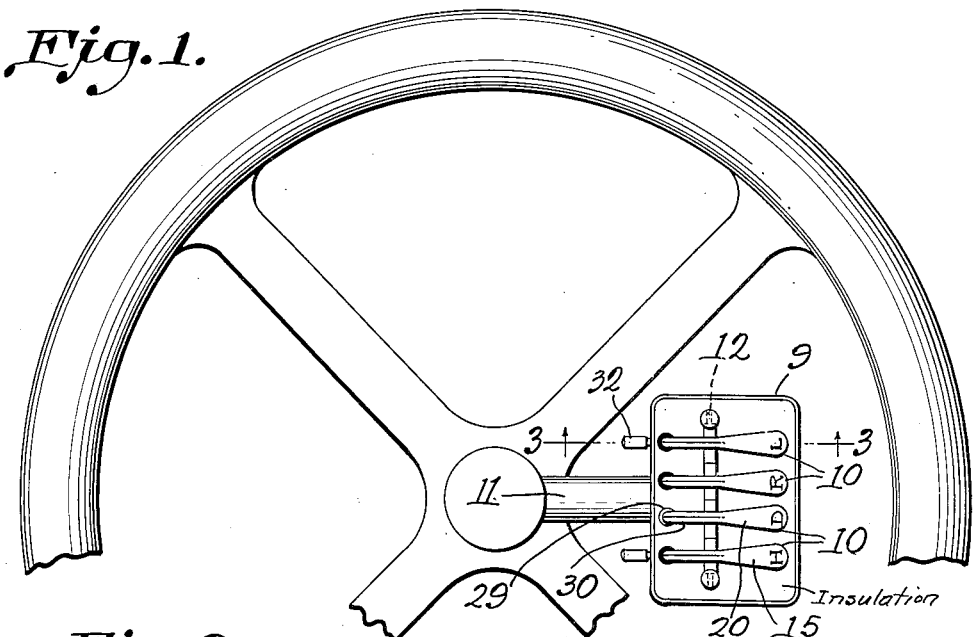
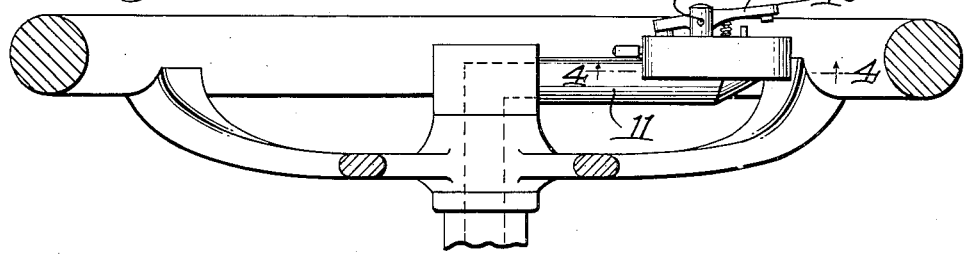
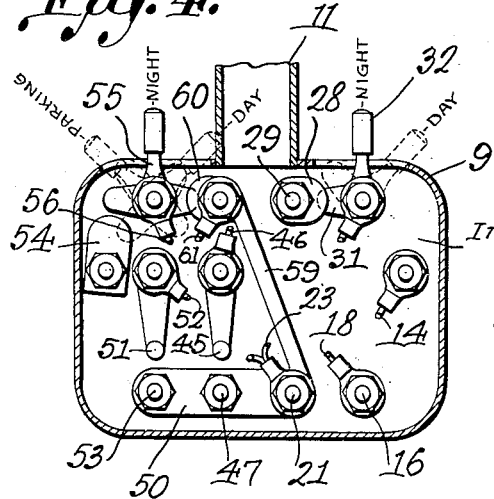
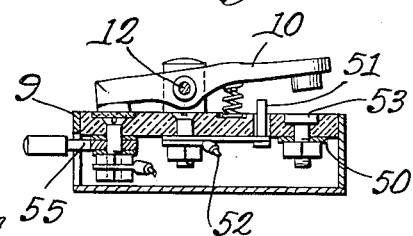
J. P. Hanson Inventor Nov. 13, 1934.    J. P. HANSON    1,980,269

SIGNAL SWITCH FOR AUTOMOBILES

Filed Jan. 7, 1931    2 Sheets-Sheet 2

J. P. Hanson   Inventor

By C. A. Snowles
Attorneys.

Patented Nov. 13, 1934

1,980,269

UNITED STATES PATENT OFFICE 1,980,269

SIGNAL SWITCH FOR AUTOMOBILES

John P. Hanson, Butte, Mont.

Application January 7, 1931, Serial No. 507,273

1 Claim. (Cl. 200—6)

This invention relates to signals designed primarily for use on motor vehicles for indicating to persons passing near the vehicle, the direction of travel to be taken by the vehicle, thereby decreasing the possibilities of colliding.

The primary object of the invention is to provide an electrically operated signal controlled by a switch mounted on a steering wheel of a vehicle, the switch being of a novel construction to be readily and easily operated by the operator of the vehicle, without the necessity of the operator moving his hands from the steering wheel.

An important object of the invention is to provide a switch for controlling the movements of the signaling device, to simultaneously illuminate the signaling device with the operation of the signal, means being provided for breaking the circuits to the lamps of the signal, for daylight driving.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental elevational view of a steering wheel illustrating a switch constructed in accordance with the invention, as mounted thereon.

Figure 2 is a transverse sectional view through the wheel.

Figure 3 is a sectional view taken on line 3—3 of Figure 1.

Figure 4 is a sectional view taken on line 4—4 of Figure 2.

Figure 5:
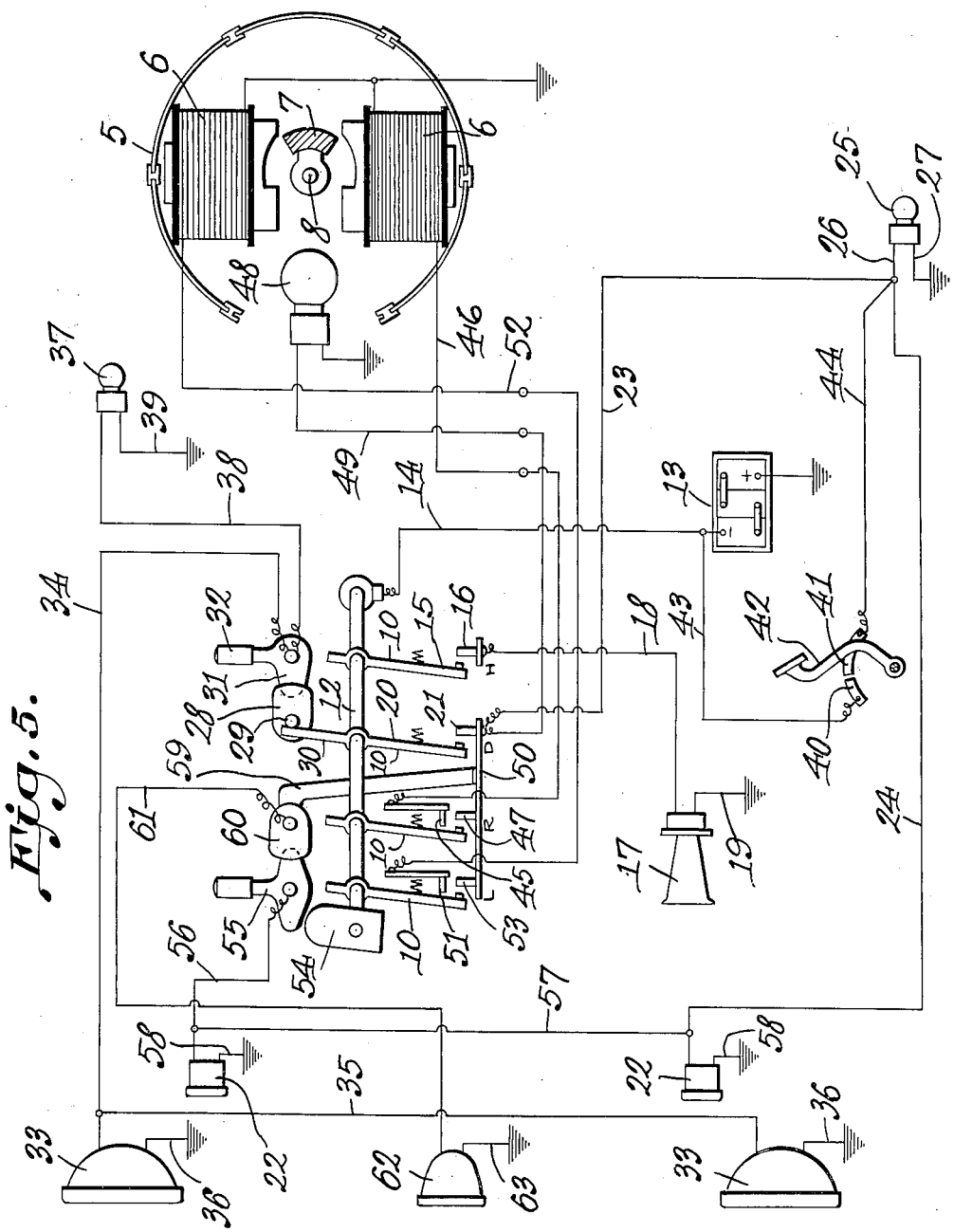
Figure 5 is a diagram illustrating the various contacts and circuits of the signal.

Referring to the drawings in detail, the signal which is indicated generally by the reference character 5, is clearly shown and described in my application for Letters Patent filed Nov. 4, 1930, Serial No. 493,399, the signal embodying magnets 6 and a pivoted armature 7, that is mounted on the shaft 8 that carries a direction indicating arrow at its upper end.

The switch is indicated generally by the reference character 9 and embodies a switch housing in which the various contact members of the switch are mounted, the levers that control the circuits through the contacts, being indicated by the reference character 10. The switch is supported in such a way that the operator will have easy access to the levers while the hands of the operator are resting on the steering wheel.

Extending from the casing of the switch, is a supporting pipe 11 through which the wires providing the circuits between the contact members of the switch and signal or lights of the vehicle, are passed. The levers are mounted on the shaft 12, which is in circuit with the battery 13, through the wire 14 that leads to the shaft 12 and connects with the shaft 12, at one end thereof. Lever 10 of the switch carrying the character H thereon, is adapted to move into contact with the contact member 16 which is in circuit with the horn 17, through the wire 18, the horn being grounded to the frame of the vehicle, through the wire 19. Thus it will be seen that if the operator wishes to sound the horn, it is only necessary for the operator to move his thumb into engagement with the lever 15, which is marked with the letter H. Switch lever 10, carrying the character D, which is also pivotally mounted on the shaft 12, carries a contact point that engages the contact point 21 that is in circuit with the dim lights 22 of the vehicle, through the wires 23 and 24, which wires are also in circuit with the lamp stop light 25, through the wire 26, the ground to the stop lamp 25 being indicated by the reference character 27.

The reference character 28 designates a contact plate mounted within the switch housing 9, which contact plate carries a pin 29 that is engaged by the extension 30 of the lever 20. Associated with the contact plate 28 is pivoted switch blade 31 that is operated by means of the handle 32, the switch blade 31 being so constructed that for night driving, the blade 31 may be moved into engagement with the contact plate 28 to complete the circuit to the headlights 33, through the wire 14, shaft 12, extension 30, pin 29, contact plate 28, switch blade 31, and wires 34 and 35, the ground wires for the headlights 33 being indicated by the reference character 36. The tail lamp 37 which is also mounted within the same lamp housing with the lamp 25, is in circuit with the switch blade 31, through the wire 38. The ground wire for the tail lamp 37 is indicated by the reference character 39. Thus it will be obvious that when the switch blade 31 is moved to engage the contact plate 28, the circuit to the headlights 33 and tail light 37, will be completed.

Contact members 40 and 41 are controlled by the action of the brake pedal 42, the contact members 40 and 41 being in circuit with the battery and stop light, through the wires 43 and 44 respectively.

The lever 10 carrying the character R has a contact member to engage the contact member 45 of the switch, which contact member 45 is in circuit with the magnet 6 at one side of the casing or housing of the signal, through the wire 46, so that when the circuit is completed to the magnet, by the operation of the lever 10, the armature 7 will be moved, to move the arrow, not shown, indicating right turn. The lever 10 carrying the character R also acts to complete a circuit by engagement with the contact member 47, upon further depression of the lever, the circuit being completed to the lamp 48 mounted within the signal casing, through the wire 49 and rod 50.

The lever 10 formed with the character L is adapted to engage the contact member 51 to complete a circuit to the magnet 6 at the opposite side of the signal casing, the circuit being made through the wire 52. The last mentioned lever 10 also completes a circuit to the lamp 48, through the contact member 53, rod 50 and wire 49.

At one end of the shaft 12 is a contact plate 54 that is disposed near the switch member 55, which switch member 55 is in circuit with the dim lights 22, through the wires 56 and 57. The ground wires for the lamps 22, are indicated by the reference character 58.

The reference character 59 indicates a bar that connects with the rod 50, the bar having a contact plate 60 at one end thereof, and in circuit with the bar 59. Connected with the plate 60 is a wire 61 which leads to the spot light 62, carried at the front of the vehicle, so that when the levers 10 are actuated, the spot light 62 will be lighted. The ground wire for the spot light is indicated by the reference character 63.

By moving the switch member 55 to a position as shown in dotted lines in Figure 4 of the drawings, wherein the switch member engages the contact plate 54, the dim lights 22 will be lighted for parking. It will of course be understood that during day time running, the switch members 55 and blade 31 are moved to disengage the contact plates disposed adjacent thereto.

From the foregoing it will be obvious that when the lever marked with the letter D is operated, the circuit is broken to the headlights 33, due to the extension 30 disengaging the pin 29. As the extension disengages the pin 29, the opposite end of the lever 10 engages the contact point 21, completing the circuit to the dim lights 22, spot light 62 and light 48, to illuminate the indicator. When the pressure on the lever 10 carrying the indicating letter D is relieved, the lever is returned to its normal position, breaking the circuit to the dim lights, spotlight, and signal light 48, and completing the circuit to the headlights 33. It will of course be understood that the tail light is in circuit with the headlights, so that it is lighted when the headlights are lighted. When the lever 10 carrying the letter R is pressed, the signal is operated, moving the indicator to the right. Further depression of the lever will complete the circuit to the light 48, illuminating the indicator.

The operation of the lever 10 carrying the indicating letter L operates in the same manner, except the indicator is operated to indicate direction of travel to the left. When the lever 10 carrying the indicating letter H is operated, the horn is brought into operation. In the operation of the levers 10, carrying the reference letters L and R, the levers are only depressed sufficiently to operate the indicator during daylight travel.

I claim:

An electric switch for controlling an electric signal, comprising a body portion, stationary contacts on the body portion and disposed near opposite side edges of the body portion, a switch lever pivotally mounted on the body portion intermediate the ends of the lever, contacts at the ends of the lever, means for urging the lever in one direction normally completing a circuit, a spring arm mounted within the body portion, a contact pin extending upwardly from one end of the arm and adapted to be engaged by the lever completing a circuit when the lever has been depressed a predetermined distance, and simultaneously breaking the normally closed circuit, and the lever adapted to engage one of the first mentioned contacts, completing a circuit when the lever is depressed to the limit of its movement.

JOHN P. HANSON.